(12) United States Patent
Quiroga et al.

(10) Patent No.: US 9,726,907 B2
(45) Date of Patent: Aug. 8, 2017

(54) REWRITABLE LENS AND METHOD OF MANUFACTURING

(71) Applicants: Juan Antonio Quiroga, Madrid (ES); José Alonso Fernández, Madrid (ES); Daniel Crespo Vázquez, Rancho Palos Verdes, CA (US)

(72) Inventors: Juan Antonio Quiroga, Madrid (ES); José Alonso Fernández, Madrid (ES); Daniel Crespo Vázquez, Rancho Palos Verdes, CA (US)

(73) Assignee: Indizen Optical Technologies, S.L., Madrid (ES)

( * ) Notice: Subject to any disclaimer, the term of this patent is extended or adjusted under 35 U.S.C. 154(b) by 92 days.

(21) Appl. No.: 14/748,134

(22) Filed: Jun. 23, 2015

(65) Prior Publication Data
US 2016/0377886 A1  Dec. 29, 2016

(51) Int. Cl.
*G02C 7/08* (2006.01)
*G02C 7/02* (2006.01)
(Continued)

(52) U.S. Cl.
CPC ............. *G02C 7/083* (2013.01); *G02C 7/022* (2013.01); *G02C 7/08* (2013.01); *G02C 7/081* (2013.01); *G02C 13/001* (2013.01); *G02F 1/132* (2013.01); *G02F 1/137* (2013.01); *G02F 1/1334* (2013.01); *G02C 2202/12* (2013.01); *G02C 2202/14* (2013.01); *G02C 2202/16* (2013.01); *G02F 2001/13775* (2013.01)

(58) Field of Classification Search
CPC ........ G02F 1/1334; G02C 7/101; G02C 7/081
See application file for complete search history.

(56) References Cited

U.S. PATENT DOCUMENTS 4,190,330 A   2/1980  Berreman
4,919,520 A   4/1990  Okada et al.
(Continued)

FOREIGN PATENT DOCUMENTS

WO        0226121      4/2002
WO      2014049577     4/2014
(Continued)

OTHER PUBLICATIONS

Laurent Pilon, "Effective Optical Properties of Nanoporous Materials—Experiments," www.seas.ucla.edu/~pilon/Optics_Experiments.htm, 2014 (Laurent Pilon's Research Group, UCLA website).
(Continued)

*Primary Examiner* — Kendrick Hsu
(74) *Attorney, Agent, or Firm* — Sheppard, Mullin, Richter & Hampton LLP

(57) ABSTRACT

A rewritable and freezable lens and method for manufacturing thereof are disclosed. This lens includes at least one active element that has optical properties that can be written, frozen and rewritten into new values at least twice. Rewritable and freezable lenses comprising active index polymer dispersed liquid crystal materials are disclosed. In-situ re-adaptation of spectacle and contact lenses is possible at the point of sale. In-vivo re-adaptation of intraocular lenses in the doctor's room is feasible, avoiding further surgery.

20 Claims, 9 Drawing Sheets

(51) Int. Cl.
*G02C 13/00* (2006.01)
*G02F 1/13* (2006.01)
*G02F 1/1334* (2006.01)
*G02F 1/137* (2006.01)

(56) References Cited

U.S. PATENT DOCUMENTS

| | | | |
|---|---|---|---|
| 5,646,754 | A | 7/1997 | Takeda et al. |
| 5,861,934 | A | 1/1999 | Blum et al. |
| 7,234,810 | B2 | 6/2007 | Warden et al. |
| 7,670,502 | B2 | 3/2010 | Francis et al. |
| 7,728,949 | B2 | 6/2010 | Clarke et al. |
| 7,971,994 | B2 | 7/2011 | Blum et al. |
| 8,228,472 | B2 | 7/2012 | Tseng et al. |
| 8,236,466 | B2 | 8/2012 | Morimitsu et al. |
| 8,240,849 | B2 | 8/2012 | Widman et al. |
| 8,625,198 | B2 | 1/2014 | Berthelot |
| 8,636,359 | B2 | 1/2014 | Warden et al. |
| 8,885,139 | B2 | 11/2014 | Peyghambarian |
| 8,906,088 | B2 | 12/2014 | Pugh |
| 2008/0023137 | A1 | 1/2008 | Jiang et al. |
| 2013/0114008 | A1 | 5/2013 | Komitov et al. |
| 2015/0029424 | A1 | 1/2015 | Gordon et al. |
| 2015/0138454 | A1 | 5/2015 | Pugh et al. |
| 2015/0146151 | A1 | 5/2015 | Liao |
| 2015/0286073 | A1* | 10/2015 | Blum ............... G02C 7/102 351/159.66 |

FOREIGN PATENT DOCUMENTS

| | | |
|---|---|---|
| WO | 2014071179 | 5/2014 |
| WO | 2014172712 | 10/2014 |

OTHER PUBLICATIONS

Laurent Pilon, "Effective Optical Properties of Nanoporous Materials—Simulations," www.seas.ucla.edu/~pilon/OpticsNanoporous.htm, 2014 (Laurent Pilon's Research Group, UCLA website).

F. Nemoto, I. Nishiyama, Y. Takanishi, and J. Yamamoto, "Anchoring and alignment in a liquid crystal cell: self-alignment of homogeneous nematic," Royal Society of Chemistry.org, Soft Matter, 2012, vol. 8, No. 45, pp. 11526-11530.

You, Y., Xu, C., Ding, S., & Huo, Y., Coupled effects of director orientations and boundary conditions on light induced bending of monodomain nematic liquid crystalline polymer plates, Smart Materials and Structures, 21, Nov. 5, 2012, 21, pp. 1-15.

F. Hudelist, R. Buczynski, A. J. Waddie, and M. R. Taghizadeh, "Design and fabrication of nano-structured gradient index microlenses," Opt. Express, Mar. 2009, vol. 17, No. 5, pp. 3255-3263.

K.-T. Cheng, C.-K. Liu, C.-L, Ting and A. Y. Fuh, "Electrically switchable and optically rewritable reflective Fresnel zone plate in dye-doped cholesteric liquid crystals," Opt. Express, Oct. 17, 2007, vol. 15, No. 21, pp. 14078-14085.

G. Li, D. L. Mathine, P. Valley, P. Pyris, J. N. Haddock, M. S. Giridhar, G. Williby, J. Schwiegerling, G. R. Meredith, B. Kippelen, S. Honkanen, and N. Peyghambrian, "Switchable electro-optic diffractive lens with high efficiency for ophthalmic applications," Proc. Acad. Sci., Apr. 18, 2006, vol. 103, No. 16, pp. 6100-6104.

J. C. Jones, S. M. Beldon, and E. L. Wood, "Grayscale in zenithal bistable LCD: The route to ultra-low-power color displays," J. Soc. Inf. Disp., 2003, vol. 11, No. 2, pp. 205-208.

D. J. Fischer, "Gradient-index ophthalmic lens design and polymer material studies," Phd, Thesis, University of Rochester, 2002.

Vicari, L. (1997), Electro-optic phase modulation by polymer dispersed liquid crystals, Journal of Applied Physics, 81 (10), May 15, 1997 pp. 6612-6615.

Basile, F., Bloisi , F., Vicari, L., & Simoni, F., Optical phase shift of polymer-dispersed liquid crystals. Phys. Rev. E, Jul. 1993, 48(1), pp. 432-438.

McKenzie, G., The evoluation of ophthalmic lens technology: from comproisimes to customized, Part 1 and Part 2, and website information, www.Adlens.com, Mar. 25, 2015.

Wallace, J., "Liquid-crystal contact lens electrically varies through 2 diopters," Laser Focus World, May 2015, pp. 18-20.

* cited by examiner

REWRITABLE LENS AND METHOD OF MANUFACTURING

BACKGROUND OF THE INVENTION

Field of the Invention

The present invention pertains to the field of optics. In particular, it relates to a lens design having a modifiable refractive index that can be maintained after applying and removing an external agent, but also can be remodified to other values.

Description of the Related Art

Ophthalmic lenses are designed to provide corrective optical power to improve visual acuity, correct for aberrations or optical defects in the eye and enhance quality of life and visual performance. Passive (fixed power) ophthalmic lenses have been known for years, and recent technical advancements allow them to correct errors in vision more precisely. However, the needed visual correction for an individual changes over time, due to age-related physiological changes, such as the onset and progression of presbyopia. In addition, an individual's needed correction may change due to stress, illness, accident, medical treatments, environmental conditions, and personal preferences. For example, if one is trying to read very fine print, or work with minute intricate machinery, one may have a need for greater magnified power. In another instance, progressive lenses typically have a near-vision reading area in the lower portion of the lens, for hand-held reading. However, if one is viewing a display mounted at the top of an eyeglass frame or a helmet, additional power for such near focus may be needed in the upper region of the viewing area. Thus, there is a need for active lenses that could allow optical power to be varied either in its total value and/or in the power distribution (placement) on the lens.

Certain methods have recently been proposed or attempted to address this need. The use of electro-optical materials for the realization of variable refractive power spectacle lenses is known. For a spectacle lens, these systems comprise an embedded set of electrodes, power connections and electro-optical material that maintains the spectacle lens refraction power as long as the incorporated battery actively supplies the necessary electrical power. These systems are constructed with active optical materials wherein an external agent (i.e. an electrical field) can change an optical property of the lens; in this case, the external agent changes the refractive index and therefore modifies the lens refractive optical power. The disadvantage is that the external agent must be present to hold the desired value of the refractive index. Typically this means the battery, or at least its connections, must be present on the spectacles, resulting in a heavier, more cumbersome or less stylish design.

Another example of variable refractive power systems are fluid-filled lenses. They consist of back and front pieces held apart by a sealing edge ring that form a flexible chamber. The flexible chamber is filled with liquid and hydrostatic pressure changes the shape of the chamber/interface. These systems react to an external agent (e.g., hydrostatic pressure) and the pressure can be maintained at a given value by sealing the chamber. If the material is unlocked (i.e., the pressure on the liquid is released), the system can become active again; thus the system is rewritable, but not "freezable" because the pressure must be maintained to keep the desired values.

For a freezable optical system, the refractive power can be locked at a given refractive state, and once the source of energy or influence that has caused the change is removed, the system remains in that locked state.

While fluid-filled lenses are an interesting development, they have certain drawbacks. The possible surface configurations are limited to the set of elastic solutions of a deformed clamped membrane under uniform hydrostatic pressure. This limits selectable power variations to a change in the total surface, or only a limiting, predetermined portion of the surface that is allowed to deform to create a different power. Thus, fewer prescriptions and fewer personalization options are accommodated. In addition, to allow predictable control of the power, a lens shape must be used that will uniformly distribute the liquid and its pressure. This typically limits the lens shape to only one configuration: round lenses. This may not be the preferred shape for many individuals. In addition, the fluid-filled lens requires double cavities, pneumatic mechanisms, delivery tubes or other components, which are often too bulky for modern and fashionable ophthalmic lenses.

The electro-optical and fluid-filled refractive power systems are rewritable, in the sense that by means of the external agent (e.g., electrostatic field or hydrostatic pressure) the refractive power distribution first can be configured, and then can be changed by altering the influence of the external agent. The electro-optical system requires a continuously maintained influence of the external agent to maintain the chosen optical power. The fluid-filled lenses require continuous pressure to maintain their chosen optical power, but have some notable limitations in their use.

In addition to the drawbacks mentioned previously, both of these systems would have significant limitations or introduce practical concerns if implemented for ophthalmic lenses other than for spectacles, goggles or head-mounted frames. While electrical connections or liquid lines can be imagined for contact lenses or intraocular lenses, their engineering, validation, maintenance and replacement will entail considerable extra work, care, investment and significant risk reduction. There is also the practical concern of whether the device will be comfortable or consistently functional for the wearer; often eyes can become extremely sensitized when even minute additional bodies are placed in the eye's physical structure. Therefore, it would be preferable to find other ways to create a rewritable lens that do not necessarily entail external connections, either intermittent or continuous.

On the other hand, non-rewritable lenses (writable only once) made with passive materials are known. For example, passive progressive power lenses have been proposed by Fischer by forming lenses (or adding material to existing lens substrates) using radiation-polymerizable material that exhibit a diffusion gradient. The desired spatial power distribution is achieved by means of a spatial pattern of the polymer-curing UV radiation; a spatial refractive index distribution is generated as a function of the polymerization degree. In this case, the generated spectacle lens is writable but not rewritable, in the sense that once the external agent (the curing UV radiation) ends, the power distribution of the lens becomes permanent. One option to ameliorate this limitation is to apply the UV curing technique to only one surface of a lens blank and manufacture semi-finished lenses. This allows further personalization and a wider range of prescriptions to be met by modifying the other surface using standard digital surfacing methods.

Other approaches to modify optical properties once (writable) by adding or combining different lens materials or embedded substances have been described in various publications, for example, in Hudelist, et al., "Design and fabrication of nano-structured gradient index microlenses," *Opt. Express*, vol. 17, no. 5, pp. 3255-3263, March 2009, and U.S. Pat. Nos. 5,861,934, 8,240,849 B2 and 8,625,198 B2.

The idea of a rewritable and freezable reflective lens is presented by Cheng, et al., "Electrically switchable and optically rewritable reflective Fresnel zone plate in dye-doped cholesteric liquid crystals," *Opt. Express*, vol. 15, no. 21, pp. 14078-14085, 17 Oct. 2007. In this work, the authors describe a rewritable reflective, or polarization-dependent transreflective, Fresnel lens based on the use of dye-doped cholesteric Liquid Crystal (LC). The lens is written or formed by the LC photoalignment effect using coherent polarized light. The formed reflective Fresnel lens is freezable because once formed, the Fresnel lens structure persists without an external agent. However, the liquid-crystal orientation of the formed lens is thermally erasable and could be rewritable to another reflective or diffractive Fresnel structure with another application of the external agent, in this case another illumination pattern directed at the LC layer. Depending on the incidence of light, this can produce reflective or dispersive (scattering) regions. The properties of this type of lens will depend strongly on wavelength, polarization and incidence angle, which can limit its practical applications. A reflective Fresnel lens would not be appropriate replacement for a transmissive spectacle lens; even diffractive Fresnel lenses have severe limitations for ophthalmic use due to their inherent scattering.

Despite these significant drawbacks, new and innovative applications of liquid crystal systems may be explored.

Bistable LC materials are known from the literature to have two possible states of polarization, each one with an associated refractive index. These materials are generally considered active because they respond to the application of an electrical field, but they are also freezable because the local polarization state remains fixed once the electrical field is removed. Such systems have been used for thin film and flat panel displays. These materials might be adapted for more innovative and complex ophthalmic applications using rewritable and freezable binary optical systems.

The previous optical systems do not combine all the properties or design freedom desired for ophthalmic lens applications. For example, they are not both rewritable and freezable to allow unencumbered and adaptable lenses. Other prior approaches do not provide enough degrees of freedom to generate arbitrary refractive power distributions, an essential feature to create optimal, personalized lenses. Additional improvements and innovations are warranted.

BRIEF SUMMARY OF THE INVENTION

The invention makes possible the creation of active rewritable and freezable refractive lenses using an external writing/erasing agent that will generate the desired optical properties for the lens. According to one aspect of the present invention, a lens with an adjustable and freezable power distribution is disclosed. Advantageously, the geometry of the lens surfaces need not be modified.

In a preferred embodiment, the material we propose can be used as a thin film and deposited onto the surface of a lens substrate or a semi-finished lens blank.

According to another aspect of the present invention, a method for manufacturing a lens with a freezable power distribution is disclosed.

One can write the lens spatial power by manufacturing the lens with an active freezable material that can be locked in a given refractive state. In this case, one can modify the local refractive index of the active material by reintroducing external agents such as electrostatic, magnetostatic, electromagnetic, thermal or irradiance distributions. With generality, these fields can vary with the spatial position on the lens, or they can change in time.

Alternatively, the tunable refractive index can be achieved by means of bistable refractive index materials. In this case, the lens comprises a nano-structured substrate having a suitable spatial distribution of bistable materials. Macroscopically they will provide the desired refractive index distribution by the effective medium approximation, as discussed in Hudelist, et al. The refractive index distribution can be set by the external agent in either the normal, tangential or any combination of both surface directions.

The refractive index distribution generated by the external agent can be erased using the same or a different external agent.

These and other features and advantages of the invention should become more readily apparent from the detailed description of the preferred embodiments set forth below taken in conjunction with the accompanying drawings, which illustrate, by way of example, the principles of the invention.

BRIEF DESCRIPTION OF THE DRAWINGS

Embodiments of the present disclosure will now be described, by way of example only, with reference to the following drawings.

DETAILED DESCRIPTION OF THE INVENTION

Figure 1:
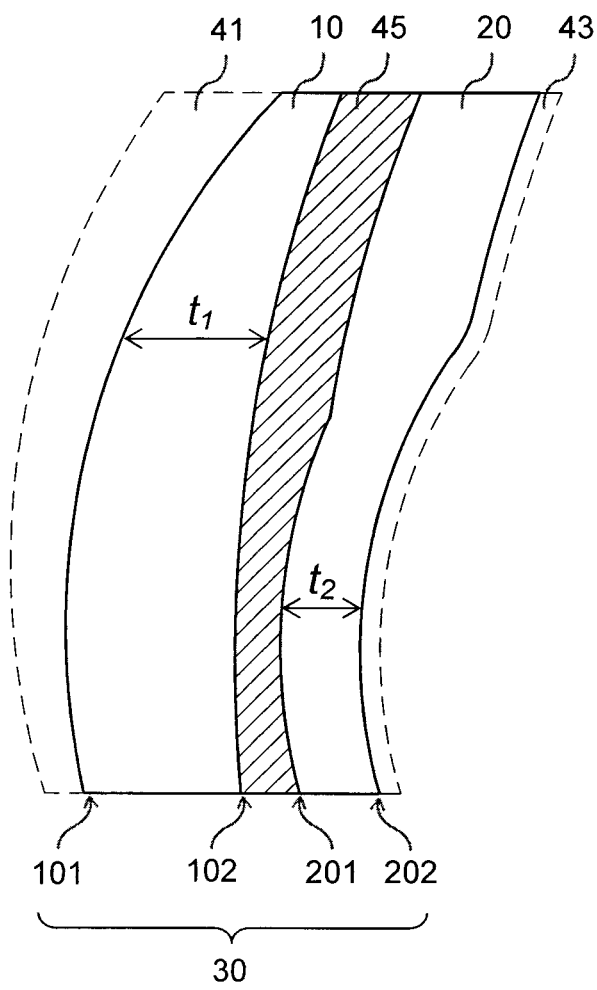
FIG. 1 illustrates a first embodiment of a rewritable and freezable lens according to the invention.

The invention is directed to the production of unique, transmissive ophthalmic optics that are both rewritable and freezable, and do not require liquid or fluid-filled chambers, thus providing greater versatility in accommodating changing eyesight prescriptions and personal preferences. The ophthalmic optics produced according to the invention are specifically designed to provide stable optical power (freezable) without the need for continuously applied energy sources or external activation. Advantageously, they can be altered in their optical properties (rewritable) without excessive effort or permanent changes to their physical structure.

In contrast to previous systems, the present invention creates a refractive (transmissive) rewritable and freezable lens that is not fluid-filled. It can also be designed to be polarization independent, and to have broad spectral response, with little dependence on the wavelength and incidence angle.

As used in this specification, the term "writable" means that the system can be written or configured with particular optical properties at least once. On the other hand, "rewritable" indicates that an optical property can be written and then changed at least twice, and preferably multiple times. Consequently, a rewritable system is a unique subset of writable materials. The term "freezable" and "frozen" means that once a writable or rewritable change has been made, it will remain stable in that changed state without requiring further input from an energy source. This is distinct from materials that revert to a previous state or a rest state when their energy source is removed.

The concept of writable properties comprises optical properties such as dioptric power, including sphere, cylinder, axis orientation, prism and other vision correcting attributes. In a preferred embodiment, the writable optical property includes at least the refractive index of the system and the ability to change the refractive index value. In another preferred embodiment, the writable optical property comprises at least control or modification of polarization. In another preferred embodiment, the writable optical properties comprise refractive index and additionally transmittance, reflectance and/or absorbance in the ultraviolet, visible and/or infrared spectral regions. In another preferred embodiment, the writable optical properties comprise the refractive index, as well as the ability to control linear, circular or elliptical polarization, preferably in at least the visible spectral range. In addition, optical properties may comprise visible color, photochromicity, thermochromicity, electrochromicity, optical density, and other features. These properties may be graded, stepped or discretely positioned in or on the ophthalmic optics, and may affect all or only part of a viewing region of the optics. If more than one optical property is writable, each such property may be written (and rewritten) in one or more areas of the lens, and various combinations of the writable optical properties may exist in different viewing regions.

It is recognized that other properties of the lens may change as the optical properties are written, frozen and rewritten according to the invention. For example, the thermal conductivity, magnetic susceptibility, electrical resistance or other physical properties may be altered when the optical changes are effected. These may be additional benefits and features of the invention, but the invention will be described in reference to optical properties.

Lens geometry comprises the curvature distribution of any of the lens surfaces, the local thickness of the lens or an element of the lens, and the shaped perimeter or edge contours of the lens and its elements. In addition, curvature has to be understood with maximum generality, being defined at each point on the surface by a system of three coordinates or parameters (e.g., x, y, z; sphere, cylinder and axis; or a matrix relationship).

The following embodiments (as exemplified by the drawings) are illustrative of the invention and are not intended to limit its scope.

The present embodiments use optical materials for ophthalmic optics. Optical materials may comprise both inorganic and organic materials, including such materials as glasses, fused silica, plastics, polymers, composites, sol-gels, and mixed inorganic/organic materials. Optical materials generally transmit at least some light that is detectable to the eye and have a sufficiently limited number of defects (in size and/or quantity) that do not inherently distort the vision. Ophthalmic optics comprise, for example, prescription spectacle lenses, reading glasses, non-prescription lenses, plano lenses, sunglasses, intraocular lenses, contact lenses and lenses mounted in or on structures held before the eyes (e.g., helmets, goggles, respirators, face shields and eye shields).

A first exemplary embodiment of a writable and freezable lens is shown in FIG. 1. The lens 30 comprises at least element 10, and preferably, at least elements 10 and 20. Element 10 is writable and comprises an active rewritable and freezable material. Element 20 is non-writable and comprises passive optical material. Element 10 is bounded by surface 101 and surface 102 and element 20 is bounded by surfaces 201 and 202. At any given location, the local cross-sectional thickness of element 10 is designated as $t_1$. Analogously, at any specific location on element 20, its local cross-sectional thickness is designated $t_2$.

In FIGS. 1-4, for convenience and understanding, the lens 30 is shown in an edgewise view. In these illustrations, the wearer's eye would be situated to the right and the wearer would look through the thickness of the lens toward the left. The lower portion of FIGS. 1-4 correspond to the lower portion of the lens as worn in, on, or in front of the eye.

As shown in FIG. 1, other optional elements may be included in lens 30. For example, FIG. 1 shows optional elements 41, 43 and 45 although one of skill in the art will understand that additional elements may also be included. Each of these elements may comprise films, coatings, discrete layers, and discrete solid structures with optical, chemical and/or physical properties desirable for the lens 30. In one example, element 41 may comprise a scratch-resistant hard coating, element 43 may comprise an anti-reflective coating, and element 45 may comprise a solid transparent, optical material with a different refractive index than element 20 and an embedded display. As shown in FIG. 1, the optional elements may have different thicknesses and varying thickness and surface contours. Each or any such elements may be of uniform thickness, may have thicknesses that are the same or different from the thicknesses of other elements of lens 30, or may have thicknesses with different values in different areas of the element. Each or any of these elements may have surfaces with the same or different curvatures, including stepped, discontinuous or changing curvatures. Each or any of these elements may comprise surfaces with similar or different curvatures from the other elements' surfaces. Those of skill in the art will recognize that any of these optional elements may be included or omitted from lens 30, or may comprise other properties or characteristics. Other optional elements may be added depending on the choice of the lens designer practicing the invention and the needs of the user.

In preferred embodiments of the invention, passive element 20 may comprise substrates, lens blanks, laminates and other optical components. Element 20 may have no optical power, or may comprise refractive power such as sphere, cylinder, prism, etc. in all or part of its area. The optical power may be the same or different in different areas of element 20 and may comprise various changes in optical power, including steps, gradations, discontinuities, linear or non-linear increases, or combinations of changes over all or discrete parts of the element. For example, element 20 may have a plano, progressive, round segment or blended bifocal lens shape, or a stepped multifocal configuration. Either or both of surfaces 201 and 202 may include these configurations and optical features or other lens characteristics known to those of skill in the art. Alternatively, the optical power or other characteristics of element 20 may be influenced or effected by embedded layers, films or other materials comprising element 20. Element 20 may also comprise passive refractive index differences, such as discrete regions with different refractive index values (for example, blended bifocals with two different optical materials), or passive gradual changes across or within a region of the element (e.g., gradient tints or gradient polarization). Such differences in passive refractive index for different regions of element 20 may be advantageous when near and distance-viewing vision correction for an individual requires different prescriptions.

In addition, element 20 and/or its surfaces 201 and 202 may comprise other features incorporated on, in or with any of these surfaces or the element, such as films, layers, inserts, coatings, passive dyes, photochromic dyes, tints, pigments, polarizers, displays, electronics, sensors, jewelry, inlays, light filters, ultraviolet filters or absorbers, infrared filters, alignment mechanisms and other discrete or continuous features. The optical material of element 20 may comprise additives such as ultraviolet absorbers, thermal or light stabilizers, light reflectors or blockers, antioxidants, surface energy modifiers and other additives or agents known in the art. Similarly, element 10 may comprise any of these configurations, embedded materials, features or additives as long as their incorporation and performance do not entirely compromise the rewritable and freezable properties of the active material comprising element 10.

As illustrated in FIG. 1, the curvatures of any of surfaces 101, 102, 201 and 202 (as well as any surfaces of any optional elements) may comprise simple or complex curves and features. One or more of the surfaces may comprise discontinuities, discrete or global steps, ledges, ridges and/or other features to effect optical or physical changes.

One of skill in the art will understand from the description that elements 10 and 20 may be shaped and configured according to the invention such that either element is designed to be positioned closest to the eye as worn in use. For convenience of illustration, FIGS. 1-4 show element 10 nearest the outer surface of the lens 30 when worn.

One of skill in the art will understand from the description that elements 10 and 20 may be the same or different in size, perimeter contours, surface curvatures or thickness. For example, element 10, or the portion of element 10 that comprises active rewritable and freezable material, may be smaller or larger than an area or volume of element 20. However, for the best operation of the invention, the extent of the portion of element 10 that comprises active rewritable and freezable material should comprise at least one "working region," meaning an area of the lens having sufficient size that a change in the optical property of this region (caused by a change of the rewritable and freezable material) is discernible by the wearer. The actual size of such working regions will depend on the optical property that is being changed, where the eye is positioned relative to the lens (e.g., whether the lens 30 mounted in, on, near or farther from the eye), and the position of the working region on the lens itself (e.g., situated near an edge of the lens, more centrally located, or offset for a particular angle of view). For example, on a spectacle lens, a working region may comprise a circular area about 4 mm in diameter to approximate a pupil size in normal viewing, or it may comprise larger areas (such as elongated regions 6-40 mm in size) to accommodate larger fields of view for wider angles of eye movement. In contrast, the working region for a face shield mounted lens produced according to the invention may need to be at least 40-80 mm in size due to the lens' greater distance from the eye and therefore the expanded solid angle of view. Element 10 may have one or more working regions, wherein the number of working regions and their size or shape may be changed as the lens 30 is written and rewritten according to the invention.

In other preferred embodiments of the invention, elements 10 and 20 are adjacent or contiguous, and may be joined or contacted by various techniques including adhesive bonding, chemical bonding, physical or mechanical mounting, van der Waals forces and other methods. In some preferred embodiments of the invention, elements 10 and 20 are configured such that surfaces 102 and 201 become one common surface or interface between the two elements. This may occur, for example, when one of the elements is formed from liquid placed against or on the other element and then subjected to energy or other action to solidify the liquid material onto the other element. As another example, one of the elements may comprise at least one compliant surface or surface coating that adapts to the surface shape of the other element when they are joined or bonded. In embodiments where element 10 and 20 have this type of interface, surfaces 102 and 201 will comprise effectively one common surface and curvature, and will be designated as 102/201.

Figure 2:
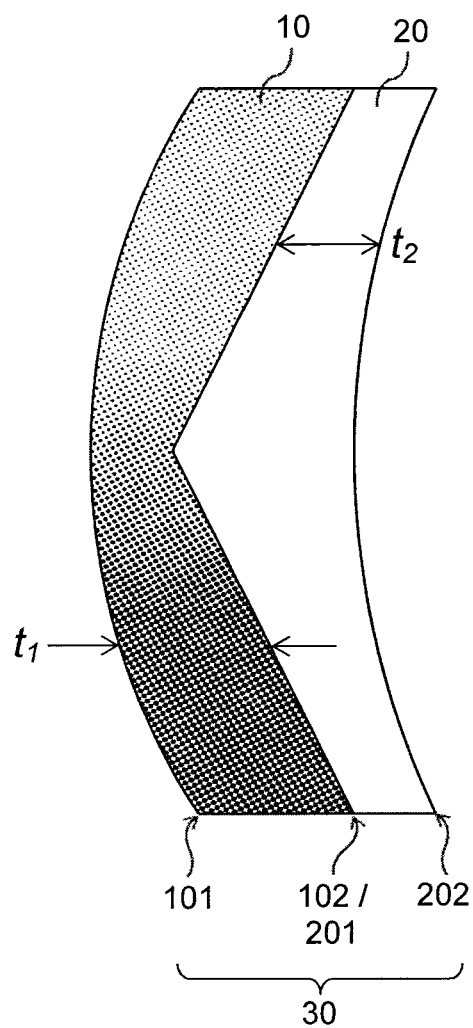
FIG. 2 illustrates a second, specialized embodiment of a rewritable and freezable lens according to the invention.

FIG. 2 illustrates a special embodiment of the invention in which surfaces 101 and 102 of element 10 have extreme and different curvatures, $\kappa_1$ and $\kappa_2$, respectively, and interface at a common surface designated as 102/201. In this embodiment, surface 102/201 is formed of flat planar sections with a discontinuity in the derivative at the center of the lens; which is an extreme example of different surface curvatures $\kappa_1$ and $\kappa_2$ for element 10. When $\kappa_1$ and $\kappa_2$ are dissimilar, even if element 10 comprises material of only one refractive index, different optical powers could be achieved in combination with element 20 due to geometric power effects. However, since element 10 comprises active, rewritable and freezable material, it will uniquely provide additional attributes to the lens of the invention.

Since element 10 comprises active rewritable and freezable material, it can uniquely be used alone to create a lens of the invention. Nonetheless, it is recognized that there may be circumstances where the active, rewritable and freezable material of element 10 may not comprise all the optical, mechanical and physical properties desired for lens 30 and, therefore, a preferred embodiment of the invention includes both elements 10 and 20. For example, the active, rewritable and freezable material may not, by itself, have sufficient structural strength for impact resistant lenses. Therefore, one may choose to support element 10 with passive element 20 comprised of optical material with greater impact resistance. Other examples of the beneficial combination of at least elements 10 and 20 for the invention will be understood from the disclosures of this specification.

One preferred group of active, rewritable and freezable materials that may be used in element 10 are "active index" materials that comprise any optical materials capable of having their refractive index altered using an external agent. It will be understood that other active rewritable and freezable materials may be properly used in the invention, but for convenience, much of the discussion and Examples will demonstrate the invention in terms of active index materials. Examples of active index materials include organic materials such as liquid crystals, electro-active, magnetically responsive, and other compounds, polymers, and organic mixtures that can be controlled for refractive index. The invention may also employ inorganic, organometallic, organic/inorganic mixtures, hybrids and combinations with writable and changeable refractive indices. In a preferred embodiment, active index materials are used to create GRIN (gradient index) features or characteristics for element 10 and lens 30.

In the embodiment shown in FIG. 2, lens 30 is designed to provide vision correction for a presbyopic individual, with one prescribed optical power correction needed for distance-viewing and another prescribed optical power needed to assist near-viewing activities, such as reading. FIG. 2 shows a typical spectacle lens configuration for presbyopes, with the distance-viewing region near the top of the lens, and the near-viewing region situated toward the lower half of the lens. In this embodiment, element 10 comprises an active index material as its active, rewritable and freezable material. The refractive index of the active index material in element 10 is constant in each of the far region (the distance-viewing region) and the near-viewing regions, but exhibits two different refractive index values of $n_F$ and $n_N$, respectively. Between the two regions of constant but different refractive indices is a "transition region" where the refractive index of the active index material of element 10 varies gradually and continuously from $n_F$ and $n_N$. These refractive index regions of element 10 are indicated in FIG. 1 by shading differences (e.g., uniformly light for the distance-viewing region of $n_F$, uniformly dark for the near-viewing region of $n_N$, and a shading gradation in the transition region where the refractive index is changing).

In certain preferred embodiments, the variation between $n_F$ and $n_N$ increases from one refractive index value to the other, and the increase may occur in a stepped, continuous or discontinuous fashion, or according to a linear or non-linear equation. In yet other embodiments, the change in refractive index (or other rewritable and freezable optical properties) may be limited to discrete regions on element 10, or may change sign, amplitude and/or rate of change across one or more areas or volumes of the active index material of element 10. Particularly with polymer systems, mixtures, hybrids and combinations of materials, the refractive indices observed for element 10 will depend on the active index material(s) chosen as well as the active index material concentration and/or thickness $t_1$ of element 10 at the specific location.

In the far region of FIG. 2, the power $P_F$ of element 10 is primarily determined by the front surface curvature $\kappa_1$ and the refractive index $n_F$ of the active index material of element 10 at that location; numerically, this far region optical power is expressed as $P_F=\kappa_1(n_F-1)$. As an example of a preferred embodiment as shown in FIG. 2, the index of the active index material comprising element 10 then smoothly increases toward the near-viewing region, where the optical power achieves the value $P_N=\kappa_1(n_N-1)$. The addition A, or increase in optical power between the far and near regions (also called the add power), is given in this case by $A=P_N-P_F=\kappa_1(n_N-n_F)$. For this embodiment with the flat planes of common surface 102/201, the values of achievable additions depend primarily on the curvature of the front surface 101 and on the increase of the refractive index. In Table 1, we show numerical examples of the add power that can be achieved using different spherical curvatures for surface 101 of the active element 10 in the embodiment shown in FIG. 2. As can be seen, an add power of 2 D can be achieved with a 10 Diopter spherical curvature for surface 101 (radius of curvature ~53 mm) using an active index material with a birefringence or maximum refractive index change of 0.2, which is a typical value for modern electro-optical materials.

TABLE 1

| $\kappa_1$ (D) | $P_F$ ($n_F$ = 1.5) (D) | $P_N$ ($n_N$ = 1.7)(D) | A (D) |
|---|---|---|---|
| 1 | 0.5 | 0.7 | 0.2 |
| 2 | 1 | 1.4 | 0.4 |
| 4 | 2 | 2.8 | 0.8 |
| 5 | 2.5 | 3.5 | 1 |
| 8 | 4 | 5.6 | 1.6 |
| 10 | 5 | 7 | 2 |

In FIG. 2 and the examples of Table 1, the refractive index increases between these two indices $n_F$ and $n_N$. Depending on the lens design and the needs of the wearer, the refractive index may be written and frozen in the same or different values at one or more regions of element 10. In preferred embodiments, changes in refractive index may proceed linearly, non-linearly, may be stepped or discontinuous, or may reverse in value; as long as the behavior of the index change is known, it can be accommodated and used effectively in the invention. In other preferred embodiments, the refractive index may decrease between $n_F$ and $n_N$, depending on the optical power or other optical effect desired, the relative positioning of element 10 and passive element 20 on or within the lens 30, and the optical properties of element 20 versus element 10. In still other embodiments, other refractive indices, other index changes instead of or in addition to $n_F$ and $n_N$, or other rewritable, freezable optical properties may be selected for the lens of this invention.

A progressive lens made in accordance with the embodiment of FIG. 2 and Table 1 would present astigmatism in the transition region near the center of the lens due to the refractive index gradient. However, this astigmatism may be acceptable for many users because its magnitude would be small, and would be constrained to the transition region. For example, the eyes of young or emerging presbyopes (e.g., wearers in their 40s and 50s) can still accommodate quite well for viewing intermediate distances and may not be adversely affected by astigmatism in this transition region, although this ability may lessen with increased age.

The major portion of the power change in the specific embodiment of FIG. 2 will be effected by the surface geometric factors of surface 101 in combination with the total refractive index differences between $n_N$ and $n_F$. However, there will be secondary effects that may contribute to or lessen the optical power achieved, which are caused by the relative change in the index over the area of the lens. These will contribute at any given location according to the second derivative of the change in the refractive index gradient at that location.

Another advantage of the invention is that even when the geometry of lens 30 is fixed (i.e., the back, front and any intermediate surfaces are defined), one can still change the lens power via the active rewritable and freezable material comprising element 10. For example, a plano powered lens element 20 with a homogenous index can be transformed into a progressive lens by writing the appropriate GRIN design (refractive index change) in or on element 10. Then the lens can be rewritten, for example, to another progressive power or a different corridor length by re-writing the active index material of element 10 and re-freezing it into a new configuration.

In yet another embodiment, element 10 is used to write a homogenous refraction index for lens 30. For example, if the index of active rewritable and freezable material comprising element 10 is fixed at a homogeneous value (constant for all lens positions) that is different from the refractive index of element 20, and the combined lens 30 is monofocal, the combined elements create a global change in the refraction index that changes the prescription of the monofocal lens in a predictable linear fashion. On the other hand, if element 10 comprises a homogeneous refractive index that is different from that of element 20, but element 20 comprises progressive or multifocal power (i.e., different through-power values in different regions of the element), the combination of elements 10 and 20 creates a global change in the refraction index that changes the different through-power values linearly, while the lens remains progressive or multifocal with the same kind of design (same corridor length and orientation, same distribution of displaced astigmatism, same locations of additional power, etc.) as element 20. These examples illustrate other embodiments of the invention; further combinations and modifications would be understood from these descriptions by those of skill in the art.

The active, rewritable and freezable material used in the invention and element 10 may comprise various materials, mixtures, composites and other combinations of materials. In preferred embodiments, the active rewritable and freezable material may be applied as a thin layer, coating, film, added material or other surface treatments of element 10. In another preferred embodiment, the active rewritable and freezable material may comprise embedded features, films, layers, substances across or within element 10. In another preferred embodiment, the active, rewritable and freezable material may comprise the bulk of element 10, or comprise a working region of element 10.

The active, rewritable and freezable materials may comprise a polymer matrix and liquid crystals. The liquid crystals may comprise various forms, including encapsulated, dispersed, conglomerated, or functionalized structures. They may also be bound to particles or solid substrates, or chemically joined to other species. They may be encased in inert or selectively reactive capsules. The polymer matrix is selected such that the solid phases of one or more polymeric material(s) or their precursors are compatible with the chosen liquid crystal(s). To form the matrix, the polymer(s), the polymer precursors and the liquid crystal(s) are mixed together, typically in a liquid state. Then the polymer is wholly or partially solidified by polymerization induced or activated by various energy sources, such as ultraviolet, infrared, thermal, radio frequency or microwave frequency, or by catalytic or other reactive processing. Preferably, the polymer matrix will comprise desirable optical, physical and mechanical properties associated with the solid polymer. The polymer matrix will preferably comprise a structure that allows maintenance of at least some of the electro-optical properties of the liquid crystal (LC) material(s); this may be accomplished, for example, by creating a flexible polymer network, or an open lattice matrix.

Depending on the degree of phase separation between the polymer matrix and the liquid crystal(s), the resultant mixture may be described as an anisotropic phase separation (in which the polymer matrix and LC materials are totally segregated), a polymer-dispersed liquid crystal or PDLC (in which the liquid crystal forms droplets in the polymer matrix, or the polymer matrix has embedded LC capsules) or a polymer-stabilized liquid crystal material (in which the polymer matrix and liquid crystal are totally mixed).

In a preferred embodiment, the rewritable and freezable material for element 10 comprises a polymer-dispersed liquid crystal (PDLC). In another preferred embodiment, element 10 may comprise droplets or capsules of one or more liquid crystal (LC) material(s) embedded or dispersed within a polymer matrix to form a concentration gradient from surface 101 to surface 102. This concentration gradient creates an accompanying gradient in refractive index through the thickness of element 10 ($t_1$), which may allow a beneficial index matching between the polymer matrix and the bulk or surface material of the non-writable element 20 (when elements 10 and 20 are adjacent or contiguous), or between surface 102 and any adjacent additional elements. Alternatively, or additionally, the gradient in refractive index caused by the concentration gradient of the PDLC may be controlled to create a change in index across various regions of the lens surface, or within various viewing regions. In the PDLC, the droplets or capsules preferably have a sub-micron size so that the PDLC will be transparent and exhibit minimal scatter in the visible region of the spectrum; more preferably, they will have a diameter not greater than 500 nm, and more preferably, less than 200 nm. The polymeric material is preferably a thermoplastic to allow greater ease in rewriting and freezing element 10.

In a preferred embodiment of a PDLC system, the melting point of the polymer matrix at its interface with the liquid crystal droplets should be similar to, or less than, the nematic to isotropic transition temperature of the liquid crystal. For example, a PDLC may be formed using poly(methyl methacrylate) (PMMA), with a surface melting point $T_m \approx C$, and E44 mixture (available from Merck & Co., Inc.) with a nematic to isotropic temperature $T_{N1}=110.9$ C. Other nematic liquid crystals (LCs) with $T_{N1}$ values in the range of about 100° C. would also be candidates for compatibility and use with a PMMA matrix; such liquid crystals or LC mixtures are commercially available from Merck and other suppliers.

In the PDLC active materials, the droplets or capsules are filled of LC molecules. The LC molecules nearest the surfaces of the droplets are anchored and have a fixed alignment (for example planar) that affects the LC alignment within the droplet and contributes to the active response of these rewritable materials. In a preferred embodiment, the polymer matrix of the PDLC is designed to have a strong dependence on the temperature. More specifically, the polymer matrix is preferably thermoplastic with a surface melting temperature ($T_m$) near the range or below the temperature of the nematic to isotropic phase transition of the liquid crystal ($T_{N1}$). If the lens is heated to the surface melting point of the polymer matrix, the LC molecules anchored on the droplets' surfaces will be free to rotate on the wetted polymer-liquid crystal interface of each droplet.

In another embodiment comprising a PDLC active material, the LC can be encapsulated to form permanent bipolar or axial LC capsules. If the polymer matrix is thermoplastic, at or above $T_m$ the polymer interface around the capsule becomes "wet," and the capsule will rotate and align in the wetted cavity.

Suitable candidate polymer matrices for PDLC materials can then be designed or chosen based on $T_m$. Another factor to refine the choice of polymeric materials is the solubility of the liquid crystal within the polymer matrix. While this can be complicated when liquid crystals are provided as a mixture of nematic species, likely candidates include various thermoplastic polymer systems, such as polyvinyl acetate, polymethacrylates, polyacrylates, polyvinyl butyrates, and other polymeric materials. Mixtures of polymers may also be used; such mixtures may even include some non-thermoplastic materials. In addition, hybrid materials with properties intermediate between thermoplastics and thermosets, reaction-injection materials, low temperature thermosets and/or thermoset systems with an open or porous structure may also be used.

In another embodiment, one may induce rotation of some of the LC molecules with selectively heating of lens 30 or portions of the lens. For example, one may heat only one of the surfaces of element 10 (e.g., surface 101 in FIG. 1), only a portion of the area of lens 30, only one of the lens' elements, or one or more of its surfaces to a temperature near the value of $T_m$. Such controlled or limited heating may provide additional specificity to effect refractive index changes in discrete regions of the lens. Once the LC molecules have the freedom to rotate or change orientation, the application of an external agent, such as an electric or electromagnetic field, will orient the interior as well as the surface LC molecules of each droplet. The direction or orientation of alignment for each droplet can be frozen by cooling down the sample. The anchoring or fixation of the LC molecule on the quenched droplet interface surface serves to maintain its orientation and position. The droplet direction or orientation (and the means of orienting) will determine the desired refractive index distribution. A frozen refractive index distribution can be obtained with this process.

The lens may be rewritten if portions or all of element 10, or portions or all of the whole lens, are heated again to temperatures at or near the PDLC droplets' surface melting point, external energy is again applied according to the chosen inventive design to orient the LC molecules, and element 10 or the lens is again allowed to cool into its new configuration. Such processes can be repeated many times, with different applications of heat and external energy, to create different lens power (or other optical property) distributions.

In a preferred embodiment, the external energy source for rewriting element 10 is an electrostatic field. In a further preferred embodiment, the electrostatic field is applied by means of a 2D array of electrodes in which the applied voltage of each electrode can be individually controlled. In another preferred embodiment, a scanning probe may be swept over the surface of the lens or element 10.

In another preferred embodiment, the external agent (external energy source) can be a magnetostatic field applied by a 2D array of electromagnets. Similar to the electrostatic energy example, it is preferred if each electromagnet can be individually controlled, for example, by different applied current. In another preferred embodiment, a scanning probe with an electromagnet may be swept over a surface of the lens or element 10.

The external agent for writing the optical properties of element 10 may be the same or different from the external agent used to re-write the optical properties of element 10. Examples of external agents include energy or force fields such as electrostatic, magnetostatic, electromagnetic, thermal or irradiance distributions. Generally, these fields can vary with the spatial position on the lens or may change in time. In addition, the same or different intensities, energy or field distributions, or types of external agents may be used to write and then to re-write lens 30.

In another embodiment, a conducting plate can be used as an energy source in connection with the inventive process. The conducting plate is preferably at least partially transparent, and may comprise materials known in the art such as Indium Tin Oxide (ITO) or other metallic oxides, or conductive polymers. This conducting plate may be formed as a thin layer within or on lens 30. For example, it may comprise a layer within either element 10 or 20, a coating or thin film on surfaces 101, 102, or 201 (if 201 is near or contiguous with element 10), or be formed as a separate element included in lens 30 (e.g., similar to optional element 41 or optional element 45 in FIG. 1). In another configuration, the conducting plate may be an external plate that is brought into near proximity with the lens, and then removed after the rewritable process is effected. One advantage of including the conducting plate as a layer within or on lens 30 is that it may be used in connection with other electronic functions of the lens, such as displays or sensors. In this case, at least partial transparency of the layer to visible light will be important for functionality of the lens. Another advantage of having at least partial transparency of this layer or external plate is to allow the rewritable processing to be monitored through the layer.

When a conducting plate is used in connection with the lens of the invention and its rewrite process, the plate is grounded during the application of the electrical field. The value of the external electrical field at each location, $E(x,y)$, across the surface of the lens element 10 will be well approximated by the voltage $V(x,y)$ applied (for example, by a 2D array of electrodes or a scanning probe) divided by the separation, d, between the field source(s) and the conducting plate at each $E(x,y)$ location. This can be described by the equation:

$$E(x,y) \approx V(x,y)/d$$

Geometric factors for this relationship are determined from a setup calibration.

In a second embodiment, a metallic conductive flat plate is placed behind element 20 of lens 30. The external electrical field at each location, $E(x,y)$, can be approximated by the voltage at each location, $V(x,y)$, divided by the separation d between the metallic plate and the applied electrical field (e.g., the electrode array or the scanning probe).

$$E(x,y) \approx V(x,y)/d$$

In another embodiment, element 10 may comprise a transparent conductive layer in contact with the active, rewritable and freezable material.

In another embodiment of the invention, the active, rewritable and freezable material of element 10 may comprise a polymer matrix containing nanocapsules with a permanent bipolar or axial orientation. The nanocapsules may comprise liquid crystal or other materials. In another embodiment, droplets formed within a polymer matrix for element 10 may have a permanent bipolar or axial orientation. With these configurations, when element 10 is subjected to heat near or at $T_m$, the oriented nanocapsules or droplets, respectively, will rotate or reorient themselves within the polymer matrix and thus can be repositioned to create a new optical effect.

In another embodiment, liquid crystals or other active rewritable and freezable material may be contained within small capsules that are dispersed in a carrier, coating, polymeric matrix or other material that comprises element 10. In this embodiment, the rewritable and freezable material is able to reconfigure or re-align within each capsule in response to exposure to outside energy.

In another embodiment, droplets comprising liquid crystals or other active species may be connected to form an irregular, interpenetrating network within the polymer matrix. The network can then be aligned by external applied energy and frozen in a new position within the polymer matrix when the system is cooled.

In another preferred embodiment, element 10 comprises active rewritable and freezable material comprising a polymer dispersed bistable material with small droplets, macromolecules or capsules that respond to an external agent by a change in optical properties. Preferably, the droplets, macromolecules or capsules are less than a few microns in size; more preferably, the droplets, macromolecules or capsules are less than 1 micrometer in diameter, and preferably less than 500 nm in diameter. For this kind of system, the free energy of the bistable material of each droplet, macromolecule or capsule has two minimums for two different polarizations $P_1=+P_s$ and $P_2=-P_s$, where $P_s$ is the saturation polarization of a single droplet. For a given wavelength, each polarization state will have a different effective index, $n_1$ and $n_2$, respectively. The effective refraction index (or birefringence change) will depend on the wavelength(s) of illumination; the intensity of the illumination; the size of the droplet, macromolecule or capsule; the refractive index of the polymer matrix; and the concentration of droplets, macromolecules or capsules in the polymer matrix.

Other examples of bistable materials that may be used include nematic liquid crystals in combination with an azo dye. Such bistable materials, as described for example in You, et al., "Coupled effects of director orientations and boundary conditions on light induced bending of monodomain nematic liquid crystalline polymer plates," *Smart Materials and Structures,* 21(2012), pp. 1-15, doi:10.1088/0964-1726/21/12/125012, 5 Nov. 2012, induce a corresponding nematic to isotropic phase transition of the liquid crystal when the azo dye undergoes its trans-cis isomerization upon activation (e.g., by exposure ultraviolet light). The process can be reversed by exposure to visible light.

In the bistable systems, when an external agent like an electrical or magnetic field $F(x,y)$ is applied at a temperature below the critical temperature of the bistable material, the local porosity associated with the $P_1$ and $P_2$ states will be $\phi_1(x,y)$ and $\Phi_2(x,y)$. These values will have a spatial dependence following the spatial variation of the external field $F(x,y)$. In this case, the local refractive index at any specified point for an element 10 comprising bistable material subjected to an external field will be given by $$n(x,y)=(1-\phi_1(x,y)-\phi_2(x,y))n_0+\phi_1(x,y)n_1+\phi_2(x,y)n_2$$

This equation uses the parallel effective medium approximation, as described by L. Pilon's research. See, e.g., L. Pilon, "Effective Optical Properties of Nanoporous Materials-Experiments," 2014. [Online]. Available: https://www.seas.ucla.edu/~pilon/Optics_Experiments.htm. [Accessed: 01-Dec-2014]; and L. Pilon, "Effective Optical Properties of Nanoporous Materials-Simulations," 2014. [Online]. Available: https://www.seas.ucla.edu/~pilon/OpticsNanoporous.html. [Accessed: 01-Dec-2014]. In this relationship, $n_o$ is the refractive index of the polymer matrix, and $n_1$ and $n_2$ are the refractive indices associated with the bistable material in each of its polarization states $P_1$ and $P_2$, respectively.

Since each droplet, macromolecule or capsule comprises an independent bistable system, the refractive index distribution will be written and frozen after retiring the external agent given that $\Delta U_0 \gg k_B T$ where $\Delta U_0$ is the potential energy barrier between the two polarization states, $k_B$ the Boltzmann constant and T the ambient temperature.

With the bistable materials of this embodiment, the rewrite-freeze process can be realized by the following steps:

1) Apply an external electrical or magnetic field (and optionally cool the lens) to set all bistable materials in the $P_1$ state. This step erases any previous refractive index distributions and all the refractive index of the active material of the rewritable and freezable material of element 10 is set to $n=(1-\phi)n_0+\phi n_1$, where $\phi$ is the porosity associated with distribution of the LC droplets in the polymer matrix.
2) Apply a spatially variable external electrical or magnetic field that matches or exceeds the temperature T and energy barrier $\Delta U_0$ value that allows the bistable materials to transition from $P_1$ to $P_2$ states. Optionally, the temperature can be increased further in this step to ensure full mobility between the polarization states;
3) Wait until the desired index distribution $n(x,y)$ is written in the active material of element 10 of lens 30; and
4) Remove the external electrical or magnetic field.

In another preferred embodiment, the rewrite-freeze process with bistable materials comprising element 10 can be realized using a constant electrical or magnetic field, $F_0$, and a variable temperature for each position $T(x,y)$. An example of such a process is:

1) Apply an electrical or magnetic field $F_0$ (and optionally cool the lens) to set all bistable materials in the $P_1$ state. This step erases any previous refractive index distributions and the refractive index of all the active, bistable material comprising element 10 is set to $n=(1-\phi)n_0+\phi n_1$
2) Apply a spatially variable temperature $T(x,y)$ of sufficient heat such that, matched with the external electrical or magnetic field $F_0$ and the energy barrier value $\Delta U_0$, it allows for the transition from $P_1$ to $P_2$ states. Optionally, the external electrical or magnetic field can be increased further above the threshold energy values in this step, to ensure better mobility or responsiveness of the bistable materials;
3) Wait until the desired index distribution $n(x,y)$ is written in the active lens; and
4) Remove the external electrical or magnetic field.

In another preferred embodiment, a combination of spatially dependent electrical or magnetic fields $F(x,y)$ and/or temperature fields $T(x,y)$ can be used for the rewrite-freeze process of the active lens.

For the embodiment of FIG. 2, the additional rewriting process of the invention allows one to tune-up $n_F$ and/or $n_N$ so that the far region prescription or the add in the near region can be adapted to new necessities or changing prescriptions of the user. In addition, a progressive corridor could be created or changed by adjusting the lens design to the user preferences.

As shown in Table 1, the embodiment of FIG. 2 requires relatively large amounts of birefringence for the active rewritable and freezable material (0.2 D in the examples in Table 1). This value is close to the maximum values of birefringence typically measured for many practical, available liquid crystals. Thus, if all or a large contribution to the optical power addition is to be accomplished by the inventive process, one may need to use fairly pure or highly concentrated amounts of liquid crystals in element 10, or choose other types of active rewritable and freezable materials for use in element 10.

In a preferred embodiment, liquid crystals are dispersed within a polymer matrix. The liquid crystal concentration may be lower and will have less effect on the overall refractive index change for the active rewritable and freezable material. For example, if the liquid crystals exhibit a birefringence of 0.2, but only account for 20% of the total content of the PDLC, then this active material can change the refractive index only by about 0.04. In that instance, with a front curvature $\kappa_1$ of 10 D, $P_N$ becomes 5.4 D (vs. 5 D for $P_F$) and the total add power achieved by this configuration of element 10 is 0.4 D. This smaller add power may still be used very advantageously to provide a small boost in power, for example, for emerging presbyopes, for use with hand-held display devices, or for a small optical power change to assist viewing and wearer's comfort when viewing other displays mounted on lenses, eyewear frames, face shields, windscreens, etc. In addition, smaller amounts of add power can be used very effectively to augment and provide more flexibility of design in free-form lens processing of the other side of the lens (e.g. surface 202 of passive element 20), such that multiple lens surfaces (and elements) combine to share and create the total add power for the wearer.

One of skill in the art will recognize that element 10 may also comprise other active rewritable and freezable optical properties, such as, for example, control of polarization, color, or optical density. These optical properties may be acted upon by similar or different energy sources than those used with liquid crystals. For example, if the active rewritable and freezable materials comprise thermochromics, controlled applications of heat or cold are advantageous for changing the optical properties such as absorption, optical density and/or color. If photochromics comprise some of the active components of element 10, then ultraviolet radiation may be quite effective to cause changes in color, absorption and optical density. In both of these examples, the thermochromic or photochromic materials may be labile, i.e., they may revert to their previous molecular configuration and first optical properties when the energy source is removed. Therefore, these and similar active materials may preferably be used in combination with, or bonded to, other materials (e.g., long polymeric structures, or within stiff cell-shaped "cages") that help maintain the active materials' altered spatial configuration. These additional materials may be acted upon by higher levels of energy or different types of energy to allow release or rewriting of the active materials.

Likewise, depending on the nature of the active rewritable and freezable materials comprising element 10, other or additional energy sources can be effectively employed. For example, if some of the active rewritable and freezable materials comprise or have attributes of photochromic and/or thermochromic materials, the external agent may be a temperature field. In one embodiment, temperature may be applied at or near one or more surfaces of element 10 or lens 30 by a 2D array of resistance wires or probes heated to discrete and controllable temperatures depending on the circulating current though each resistance. In another preferred embodiment, temperature may be applied as the energy source by means of a scanning probe passing over the lens with controlled and variable resistance.

In another preferred embodiment, if the active rewritable and freezable material may be altered by optical radiation (e.g., materials comprising or having attributes of photochromicity), the external agent may be a spatial pattern of irradiance created by imaging an object transmittance on one or more sample planes associated with element 10. In another preferred embodiment, a scanning probe with a variable power light source can be passed in a controlled manner over or across the surface 101 of element 10, or applied on or near lens 30, to effect the desired radiation-induced changes in element 10's optical properties.

Figure 3:
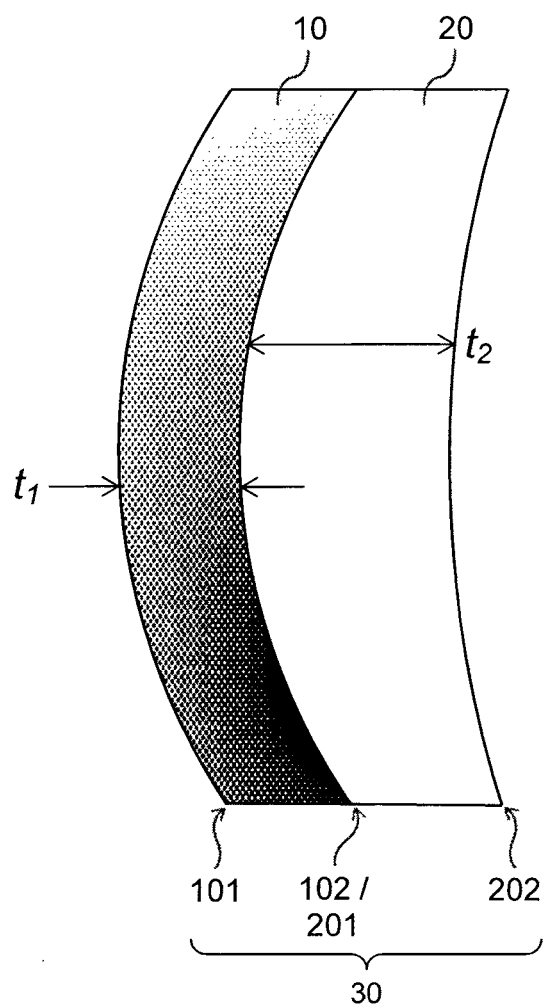
FIG. 3 illustrates another embodiment of a rewritable and freezable lens in which the surfaces 101 and 102 of element 10 have the same curvatures.

FIG. 3 shows another embodiment of the invention that exemplifies additional advantages of the invention and, particularly, its useful contributory effect to optical power and/or other optical properties of the lens. Similar to the embodiments of FIGS. 1 and 2, the lens comprises element 10 made of active material and a non-writable element 20 made of passive material. Surfaces 101 and 102 of element 10 are each spherical surfaces with the same curvature so that the thickness of element 10 is constant. Therefore, the power of active element 10 is not achieved by surface curvature; instead, it is achieved by index variation across the whole surface of element 10 (when the active rewritable and freezable material is limited to a surface of element 10) and/or by the index variation that may be accomplished in any direction (x,y,z) over and within element 10, including throughout its thickness.

In the embodiment of FIG. 3, element 10 comprises an active material with optical properties that can be written and fixed (frozen), and then rewritten at least once. As an example, element 10 may comprise active index material whose refraction index can be varied continuously along the transverse coordinates x and y. In a preferred embodiment, the refractive index varies in a known and/or controllable manner down the surface and/or down the bulk of element 10 as worn in use. This increase in refractive index is indicated in FIG. 3 (and in FIG. 4) by the increased shading down the height of element 10 and extending throughout the thickness of element 10. In another preferred embodiment, the refractive index of element 10 may vary in three dimensions; that is, in a preferred embodiment, the refractive index of the active index material that comprises at least a part of element 10 varies in its value both down the height of element 10, and also varies in its value between the surfaces 101 and 102. This is illustrated in FIG. 3 by the darker shading as one progresses from surface 101 toward surface 102 in the lower portion of element 10. In one illustrative example, the refractive index of the active rewritable and freezable material comprising element 10 may have a refractive index value of approximately 1.5 near the top of the lens 30 as it will be worn in use, but the index value increases toward 1.6 both toward surface 102 and down the lens toward the lower, near-viewing region of the lens as worn. Such an increase in refractive index would be especially suitable and useful if element 20 in this configuration is contiguous with element 10 (as shown in FIG. 3) and the passive element 20 has a higher refractive index than 1.5. In another example, if the refractive index value for the active index material increases over element 10 from about 1.5 to 1.65, and element 20 has a constant refractive index of 1.67, an increase in refractive index across the thickness $t_1$ of element 10 from surface 101 to 102 would help reduce light losses at the interface (102/201) between elements 10 and 20.

As discussed previously, passive non-writable element 20 has one or more fixed refractive indices. Element 20, one or more of its surfaces, and in a preferred embodiment, surface 202 may comprise various shapes, including stepped, gradient, discontinuous, continuously variable, progressive, spherical, toroidal and other shapes, as used in the ophthalmic industry and in the development and implementation of free-form lenses. In a preferred embodiment, the designer may choose to divide the power of the whole lens 30 such that part of the optical power or other optical properties is contributed by the working region of active rewritable and freezable material of element 10 and other portions of the power or optical properties are provided by passive element 20. With this invention, the designer has much greater freedom to accomplish or enable innovative optical lenses and unusual properties for these lenses.

The through optical power can be calculated for any given point (x,y) of viewing through lens 30. For a lens 30 as shown in FIG. 3 (having the same curvatures for surfaces 101 and 102 and refractive index changes down the height and through the thickness of element 10) it can be shown that, assuming the lens elements to be thin, the optical through power observed at a specified point (x,y) is given by $$\mathbb{P}_{(x,y)} = -t_1 \mathbb{H} + (n-1)\mathbb{Z}_1 + (n_0 - n)\mathbb{Z}_2 + (1 - n_0)\mathbb{Z}_3 + \nabla z_{12}\square^T n + \nabla n \nabla^T z_{12}, \quad (1)$$

Where: $\mathbb{H}$, $\mathbb{Z}_1$, $\mathbb{Z}_2$, $\mathbb{Z}_3$ are the hessian matrices of the bi-variate functions n(x,y), $z_1(x,y)$, $z_2(x,y)$ and $z_3(x,y)$; $\nabla$ and $\nabla^T$ are respectively the column and row forms of the gradient operator; $n_0$ is the refraction index of passive element 20; n≡n(x,y) and is the refractive index at point (x,y) for element 10; $z_{12} = z_1 - z_2$; $z_1$ is the surface height at (x,y) for surface 101; $z_2$ is the surface height at (x,y) for surface 102/201, and $z_3$ is surface height at (x,y) for surface 202. Each of these surface heights are measured as a relative excursion in height from the (0,0) sag value of their respective surfaces (e.g., $z_1$ is the relative surface height at (x,y) vs. the minimum sag height of surface 101, $z_2$ is the is the relative surface height at (x,y) vs. the minimum sag height of surface 102/201, etc.).

Since $\mathbb{Z}_1$ and $\mathbb{Z}_2$ are identical in the configuration of FIG. 3, the power is finally given by $$\mathbb{P} = -t_1 \mathbb{H} + (1 - n_0)\mathbb{Z}_3 + (n_0 - 1)\kappa \Pi \quad (2)$$

where κ is the common curvature associated with both surfaces 101 and 102, and Π is the 2×2 identity matrix.

In general, the power perceived by a user of an optical element as the one shown in FIG. 3 has to be computed by exact ray tracing to accurately describe the optical performance. This type of computation does not reduce the generality described in this example, as it only determines the final functional form of surfaces and index distribution. The previous equation is sufficient and practical to determine the values of index and surface curvature distribution that could be used to design the active element 10.

As equation (1) shows, the most important factors in achieving the desired power distributions are the refractive index gradient and change in the curvature of the index change (by means of the hessian matrixes).

There are many methods that may be employed to create the lens of the invention. One exemplary approach is outlined here:

1) Identify the optical properties desired for the written lens 30.
2) Select a starting configuration for element 10, and select an active rewritable and freezable material for at least a portion of element 10. Determine the positioning or distribution of active rewritable and freezable material for element 10. For this exemplary approach, the active rewritable and freezable material comprises an active index material.
3) Select a starting passive element 20, with either the final optical properties desired for element 20, or selected such that by known optical processing techniques, it can be finished to the final optical properties desired for element 20.
4) Assemble the selected element 10 and a selected passive element 20 into an ophthalmic lens configuration.
5) Expose at least the active rewritable and freezable material of element 10 to a first external energy source of sufficient energy to set all the active index material to a first refractive index.
6) Measure the optical through power distribution of the ophthalmic lens configuration at this intermediate stage.
7) Determine the difference between the optical through power distribution of the ophthalmic lens configuration at this intermediate stage and the desired optical through power distribution of the written lens 30.
8) Design a pattern and distribution of changed refractive index for the active index material comprising element 10 that will supply the difference between the optical through power distribution of the ophthalmic lens configuration at this intermediate stage and the desired optical through power distribution of written lens 30.
9) According to the pattern and distribution designed, expose at least a portion of the active index material of element 10 to a second external energy source of sufficient energy and energy distribution to change the refractive index of the active index material to the designed pattern and distribution of step 8). The second energy source may be the same or different from the first energy source in energy type, intensity, or spatial or temporal distribution.
10) Wait until the changed refractive index pattern and distribution are written on the lens.
11) Remove the second external energy source. If necessary, finish element 20 by known optical processing techniques (such as surfacing, polishing fining, coating, etc.) to obtain the final optical properties desired for lens 30.

To rewrite lens 30 to a new configuration, the procedures outlined in steps 1 and steps 5-11 can be repeated. For re-writing, the types of external agents applied to the active index material of element 10 may be the same or different from those used in the first written lens. The energy, spatial and temporal distributions may be the same, similar or different from those used during the writing process as well.

This is just one general example of a method to create the lens of the invention. One of skill in the art will recognize that variations, modifications and additions to these steps can be carried out within the scope of the invention.

The invention will be further described in the following Example.

Example 1

Figure 4:
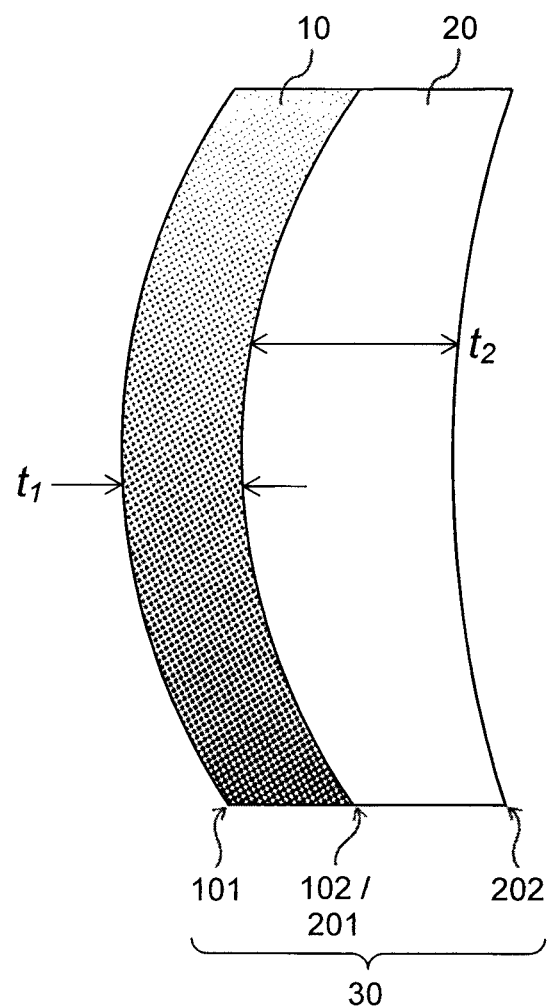
FIG. 4 illustrates another embodiment of a rewritable and freezable lens according to the invention.

FIG. 4 illustrates an example of a progressive power spectacle lens designed and created according to the invention. The design of the initial rewritable and freezable lens is planned as follows: 40 mm round diameter of lens; 0.75 D distance optical power; total add power value of 1.25 D; progressive lens corridor length of 7.5 mm; and 10% of the total add power is obtained 3 mm below the geometrical center (0, 0) of the lens. In this Example, 40% of the add power (0.5 D) is achieved by active element 10 comprised of an active index material, whereas the remaining 0.75 D is achieved by the element 20 which comprises a progressive surface 202. Element 10 is configured such that both surfaces 101 and 102 have the same curvatures and $t_1=1$ mm; thus, if there were no change in refractive index over or within element 10, it would contribute no additional power to the lens. However, in accordance with the invention, element 10 comprises an active index material that is capable of an index change (birefringence) of 0.025, which can be readily achieved with a typical PDLC as the active index material.

Figure 5:
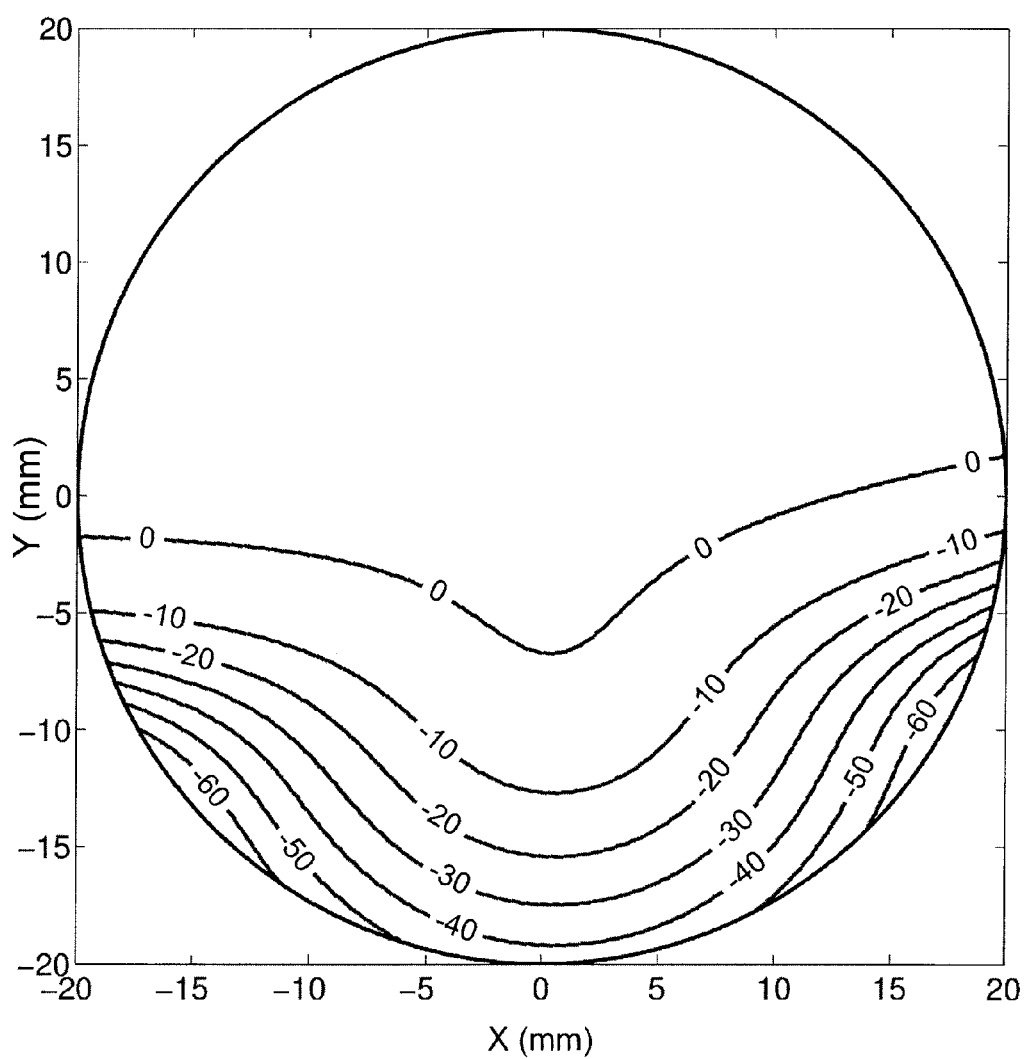
FIG. 5 shows scaled by 1000 the map of refractive index change over the central 40 mm diameter area of element 10 for an exemplary embodiment of the invention as shown in FIG. 4 in which element 10 is designed to provide an addition power of 0.5 D for a progressive lens 30. The point (0, 0) corresponds to the geometric center of the lens. Negative values on the y-axis correspond to the lower half of the lens as worn and negative values on the x-axis correspond to the nasal side of the lens as worn.

The map of the required refraction index change for element 10 in this Example is shown scaled by 1000 in FIG. 5. The geometric center of the lens is (0,0), and positive values on the y-axis scale identify the upper portion of the lens as worn in use. Negative values of y identify points in the lower portion of the lens as worn and include the area associated with the add power of the progressive lens. The refraction index change is designed to have negative values, that is, the active index material is written and frozen in position such that it has a smaller refractive index in the lower portion of the lens than in the upper portion.

Figure 6:
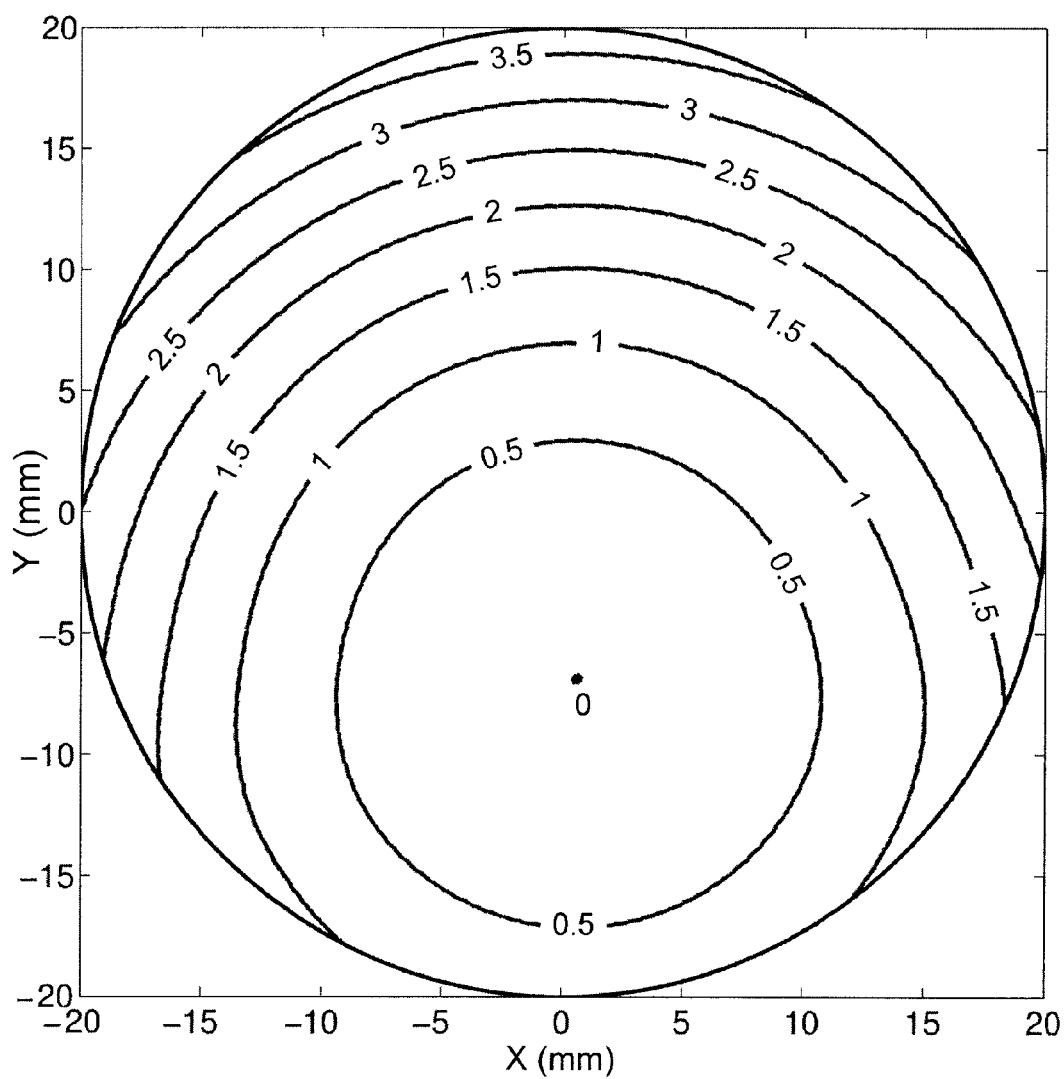
FIG. 6 shows the surface height distribution map in mm of surface 202 of element 20 to be used in combination with element 10 as shown in FIG. 5 for a progressive lens 30 according to the invention.

The associated surface height distribution of the inner, progressive surface 202 of element 20 in this Example is presented in FIG. 6. The top of the lens is indicated by y=20 mm, and the bottom of the lens (as worn) is indicated by y=−20 mm. The surface contour are in units of mm, with (0,0) identifying the minimum thickness of element 20 and the maximum back vertex distance. Positive values of the contours indicate surfaces closer to the eye than the back vertex.

Figure 7:
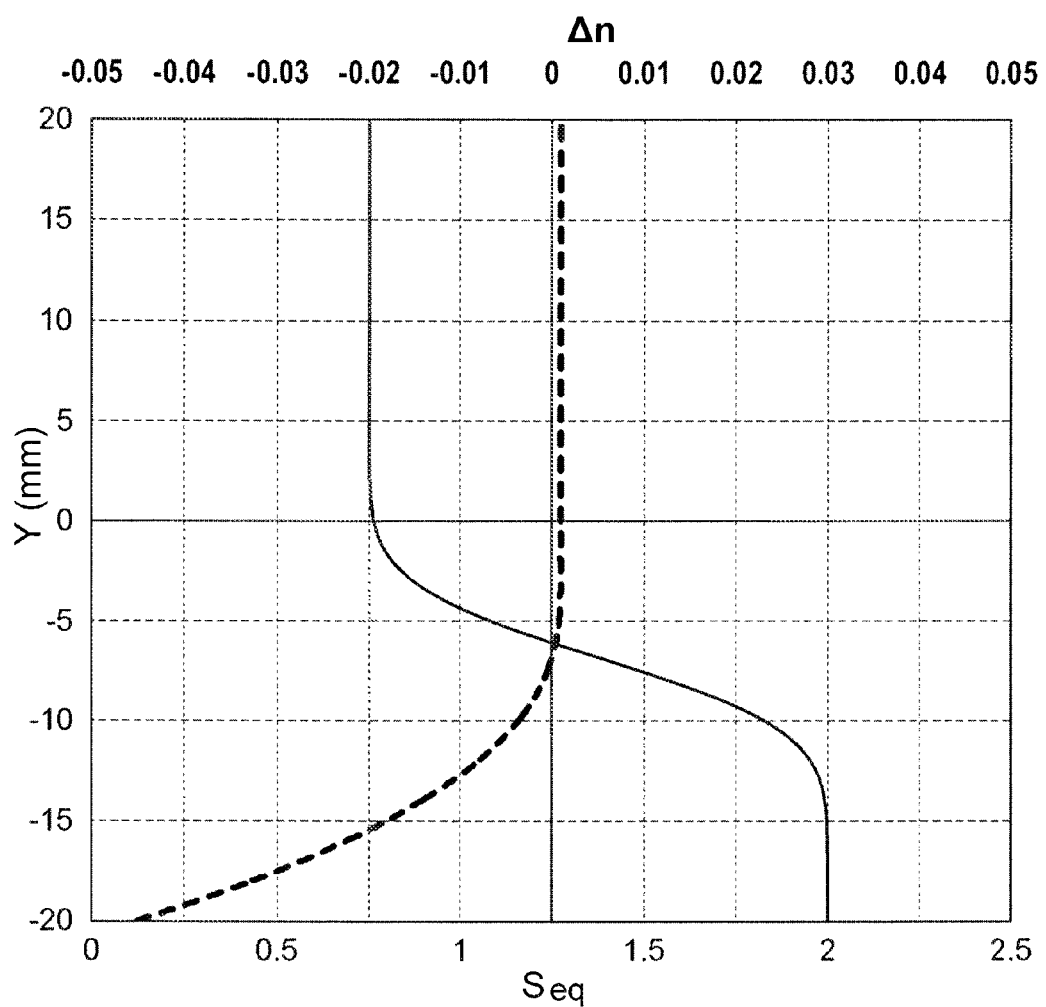
FIG. 7 shows a plot of Δn, the refractive index change (dotted line) and spherical equivalent power change (solid line) as a function of distance along the y-axis for the lens 30 comprised of the elements shown in FIGS. 5 and 6.

FIG. 7 shows a plot of the refraction index change, Δn, associated with active element 10 (dotted line), and the resultant total optical through power of the lens 30 (solid line), as each property would be measured along a line passing from the top edge of the progressive lens (y=+20 mm), through the lens' geometric center (y=0) and down the corridor length into the add power region. The optical through power is reported as the spherical equivalent power of the lens, in accord with standard industry practice. Note that the optical through power of the lens becomes constant in the lower, near-viewing region of the lens even though the refraction index of element 10 continues to change throughout this region. This is due to the relationship between the refraction index change and the geometry of this exemplary lens. With the constant thickness of element 10, the refractive index will vary as a function of the second derivative of the refraction index. Thus, as shown in FIG. 7, as the refraction index begins to change near the geometric center of the lens, the optical power of the total lens increases. Once the change in refraction index-reaches a steady rate, near about y=−15 mm, the total optical through power maintains a constant value.

As shown in Example 1, this index distribution together with the geometry described in FIG. 4 easily allow for a progressive power lens to be created with an add power of 1.25 Diopters (divided between the two elements 10 and 20). This can be accomplished even when element 10 has been written and frozen such that the refractive index change is only about 0.02 less for a position 15 mm below the geometrical center (within the stable add power near-viewing region).

Once the lens is manufactured, the curvature of surface 202 cannot be altered. However, by re-writing and refreezing the refractive index distribution of element 10, one can still modify the optical power and optical power distribution of the lens. For example, the refractive index of element 10 can be reset to the original index by re-application of the energy source. A moving energy source is then presented across surface 101 to rewrite and refreeze the index distribution into a new configuration, such as a different total add power, a different corridor length, a different width to one or more viewing zones, or other desired changes.

Figure 8:
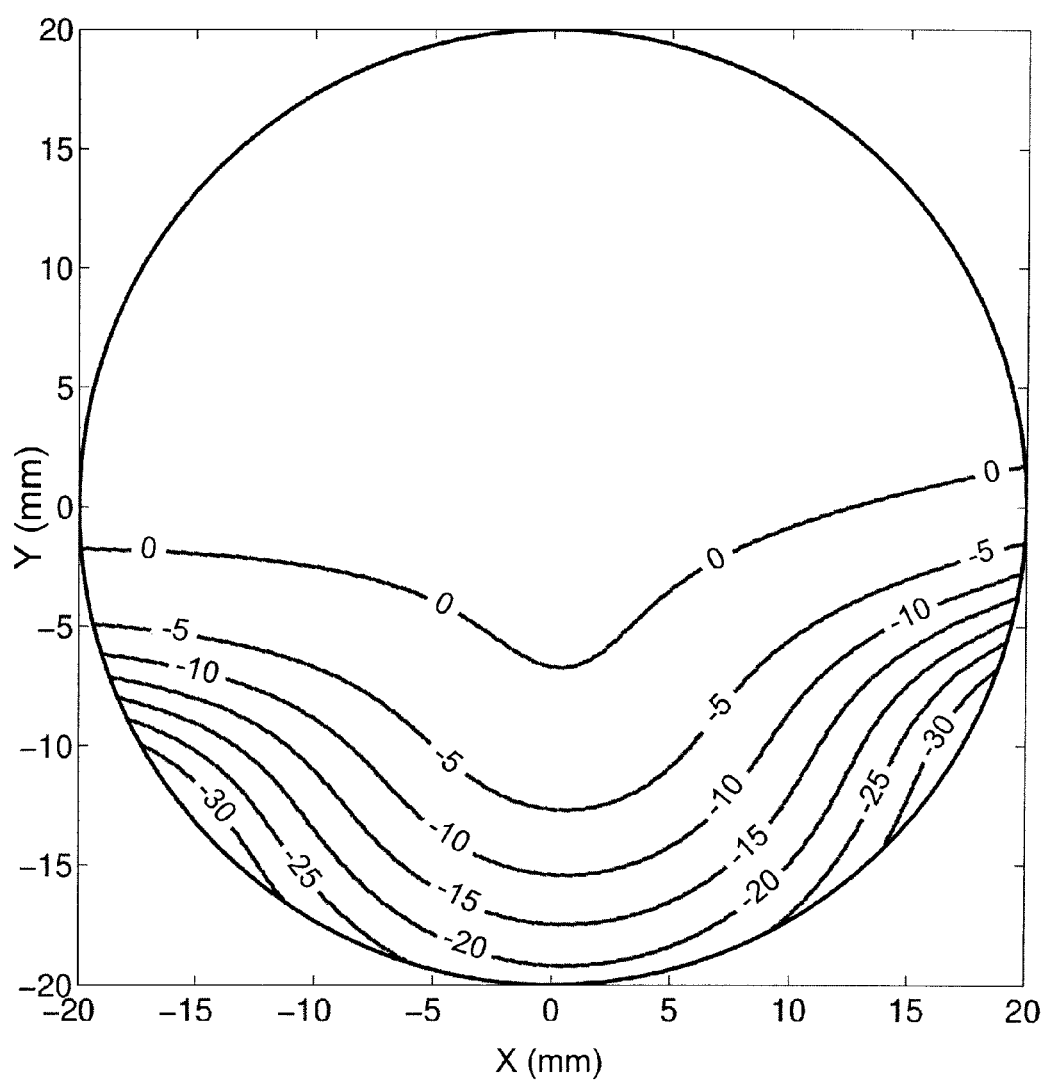
FIG. 8 shows, scaled by 1000, the map of refractive index change over the central 40 mm diameter area of element 10 for an exemplary progressive lens 30 of the invention, when element 10 is rewritten to provide an addition power of 0.25 D in combination with the passive element 20 shown in FIG. 6.
Figure 9:
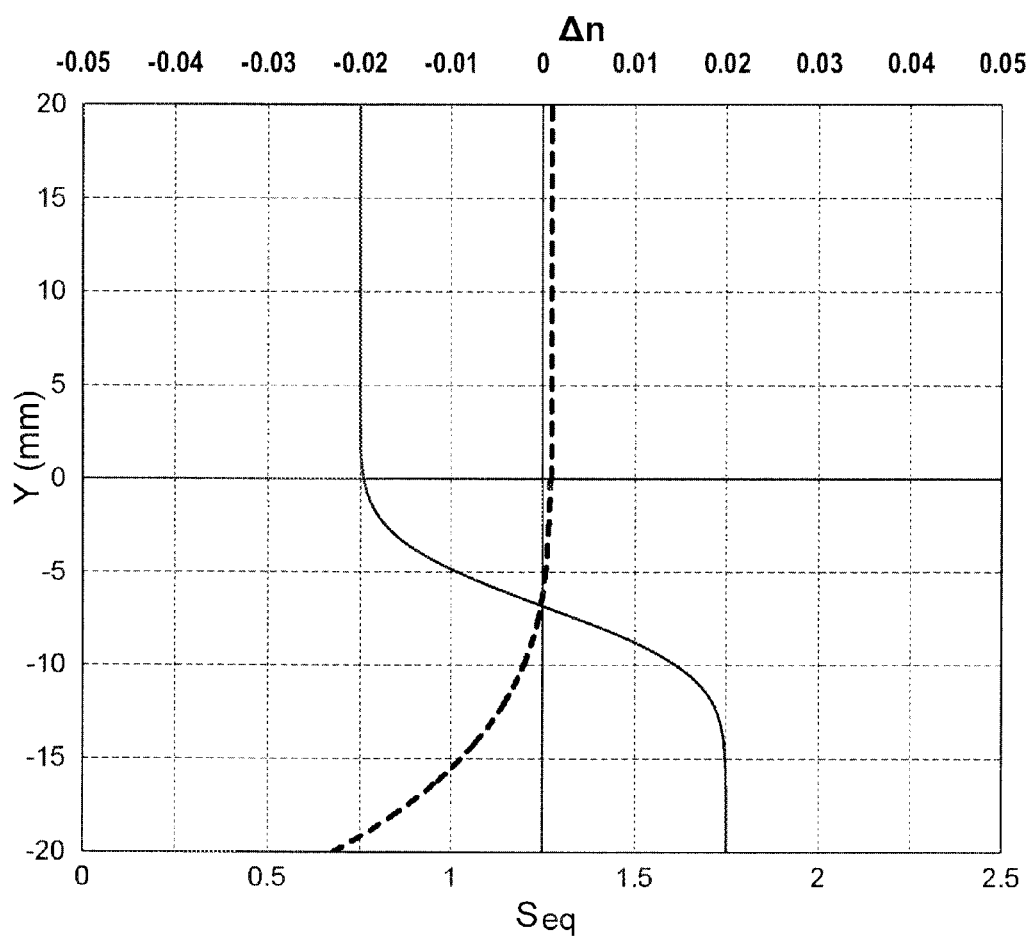
FIG. 9 shows a plot of Δn, the refractive index change (dotted line) and spherical equivalent power change (solid line) as a function of distance along the y-axis for the rewritten lens 30 comprised of the elements shown in FIGS. 8 and 6.

As an illustration of the rewrite process of the invention, the lens described in FIGS. 5-7 can be rewritten to change the total add power of lens 30 to 1.00 D but maintain the same progressive design parameters. The rewrite of element 10 to contribute 0.25 D to the add power of the lens is illustrated in FIG. 8 scaled by 1000. Note that the refractive index change, Δn, required for this rewrite of element 10 is even less than the change created and used for the first configuration. FIG. 9 shows the data for the rewritten lens of Example 1 in a similar way to FIG. 7. The dotted line shows the change in refractive index (Δn), and the solid line shows the spherical equivalent through optical power of the lens 30 in its rewritten form, as measured for a line passing from the top of the lens through the geometric center (0,0) and down the corridor to the bottom edge of the lens as worn.

It is worth noting that the full addition power for the written, frozen and rewritten lens 30 in this Example could be achieved with an effective birefringence or maximum refractive index change of less than 0.03. This magnitude of change in birefringence is achievable with commercially available active index materials and with the techniques presented here to produce freezable index distributions.

Another preferred embodiment of the invention occurs in a configuration similar to those illustrated in FIG. 3 or 4, except that the curvatures of the surfaces 101 and 102 are not the same. In this case, the optical power contributions provided by element 10 when it comprises active index materials will be derived not only from the index variation but also from the difference in curvature of the first and second surfaces (a geometrical optics effect); in the case of two different spherical surfaces for 101 and 102, respectively, this will be a scalar value given by $\Delta\kappa=\kappa_1-\kappa_2$. This configuration gives more flexibility to choose among different index distributions. In addition, the required range of index variation can be modified depending on the values of the parameter Δκ. The writing/freezing/rewriting process of the elements would be similar to the process described previously.

In the embodiments presented, active element 10 comprises active rewritable and freezable material positioned in front of the non-writable element 20 (that is, element 10 is positioned farther away from the eye). Element 10 may also be placed at the back surface of lens 30 (i.e., positioned nearer to the eye when worn by the user of the invention). In another preferred embodiment, element 10 may be embedded within lens 30. In any of these or other embodiments, additional layers, coatings or elements may be included with the lens 30 as shown in FIG. 1, or may be applied to one or more surfaces of element 10 and/or element 20, to enhance the performance of element 10, 20 and/or the entire lens 30.

In another embodiment, lens 30 may comprise more than one element 10, comprising the same or different active freezable materials. This embodiment allows further control and tailoring of optical properties. For example, if a desirable rewritable material exhibits only a small refractive index change, multiple element 10 constructs for lens 30 may be used in series to increase the effect. For example, if the rewritable and freezable optical property comprises control of polarization control, one might create regions with different polarization output given the same input state of light. Multiple element 10 constructs may also be preferred if the active rewritable and freezable material of element 10 has desirable optical properties but less desirable mechanical, chemical or physical properties (for example, if it is more easily damaged than the material of element 20). In another advantageous embodiment, different element 10 constructs can be used in combination to enhance the rewritable elements' effectiveness.

The invention is suitable for implementation for various types of ophthalmic lenses. This includes spectacle lenses, lenses for goggles, insert lenses, and other lenses for face shields, respirators, helmets, eye shields and other face-mounted gear. The invention may also be used for contact lenses and intraocular lenses.

There are several other advantages of the invention. One skilled in the art knows that the design (i.e., the distribution of power and aberration) of a progressive power lens (PPL) is a major characteristic determining how well a user will adapt to the PPL. Different wearers have different sensitivities to the variables and options of PPL designs. The technology described in this invention may allow the modification and fine tuning of the design of a PPL so that the user, after a few cycles of rewriting and freezing the configuration of element 10, would get the very precise design that better fits their needs. This should be a much quicker and less onerous process than re-ordering and re-grinding new lenses.

Another advantage is that lens manufacturer using a single writable lens blank, with the active material applied on one surface, could produce lenses with almost any kind of power distributions. Further optimization and/or personalization of the lens could be done by standard digital surfacing of the other lens surface. This invention provides lens manufacturers with extra degrees of freedom (refractive index distribution on one side, curvature distribution on the other side) to improve lens performance beyond the limits of standard free-form technology.

There are additional advantages for the wearer, too. A user with a time-varying refractive error (e.g., progressive myopia, a patient with binocular problems undergoing visual training, or patients with conditions such as hyperopia, ectatic cornea, or keratoconus) could benefit from the freedom and ability of the invention to modify the power and/or power distribution of their lenses. With this invention, the user could afford the expenses from high quality coatings (for examples, premium AR, scratch resistant, polarization and photochromic coatings) even with lenses whose power or power distribution has to be revised periodically. If such multiple changes are anticipated, one might use a preferred configuration in which element 10 is embedded within the lens 30 or at least comprises protective outer coatings or cover plates. For example, a transparent dielectric layer or an additional element 41 may be placed over active element 10. If electrical energy is then directed through the layer or element 41 to write and rewrite element 10, it may be necessary to increase the energy or the time of exposure to effect the same change as that occurring by direct exposure of element 10. If magnetic energy is used to effect the changes to element 10, exposure through such dielectric or magnetically-transparent layers or intervening elements will cause minimal reduction to the energy field. In a preferred embodiment, such protective layers, coatings or additional elements will have a plano power or a conformal contour to the adjacent surface of element 10.

Additional advantages may be realized if the method of producing the rewritable and freezable lens is performed at the optical dispensing location, or during the process of fitting the lenses. For example, the invention can be used for manufacture of spectacle or contact lenses at the point of sale using a more limited number of lens blanks, or "finished" lenses further modified and personalized by the rewrite and freeze process of the invention.

The rewritable and freezable lens would also be useful and practical for re-adaptation of spectacle and contact lenses at the point of sale, avoiding the extra time and expense to manufacture a new pair of spectacles and contact lenses.

The rewritable and freezable lenses and the disclosed methods make possible the manufacture of intraocular lenses in the operating room with a reduced set of blanks, re-adaptation of intraocular lenses in the operating room based on the physician's direct observations during the procedure, and in-vivo re-adaptation of intraocular lenses in the doctor's room, without the need of any further surgery.

One important inconvenience of intraocular lens (IOL) implantation is that any error on the eye biometry, or the surgical procedure, will turn into a refractive error. Correcting it would require additional use of external spectacle or contact lenses, or a new (and risky) surgical procedure. An implanted IOL using the technology described in this invention could be tuned by the application of harmless electromagnetic radiation, for example, magnetic fields of power much lower than common MRI treatments. This procedure could remove or counteract the effects of a biometry error, surgically produced corneal deformations, or incorrect positioning of the IOL.

Although the invention has been disclosed in detail with reference to preferred embodiments, and multiple variations or derivatives of these embodiments, one skilled in the art will appreciate that additional substitutions, combinations, and modifications are possible without departing from the concept and scope of the invention. These and similar variations would become clear to one of ordinary skill in the art after inspection of the specification and the drawings herein. Accordingly, the invention is identified by the following claims.

The invention claimed is:

1. A rewritable and freezable transmissive ophthalmic lens comprising:
   at least one working region,
   a first element comprising an active index rewritable and freezable material having a first refractive index value in the at least one working region of the lens,
   wherein application of a first external energy source to the at least one working region changes the first refractive index value into a refractive index distribution in the working region that imparts a discernible change in the optical power of the lens that remains when the first external energy source is removed;
   wherein application of a second external energy source to at least a portion of the at least one working region changes the refractive index distribution and imparts a further discernible change in the optical power or the optical power distribution of the lens that remains when the second external energy source is removed; and
   wherein the lens does not comprise a conductive plate or layer.

2. The lens of claim 1, further comprising a second element comprising non-writable passive optical material.

3. The lens of claim 2, wherein the second element and the first element have a common surface, and wherein the second element is nearer to the wearer's eye than the first element when the lens is in use.

4. The lens of claim 1, wherein the active index material further comprises optical properties selected from photochromicity, electrochromicity, thermochromicity and modification of polarization.

5. The lens of claim 1, wherein the rewritable and freezable material comprises a liquid crystal.

6. The lens of claim 5, wherein the ophthalmic lens is selected from the group of spectacle lenses, face shields, eye shields, goggles, insert lenses, lenses for respirators, lenses for helmets, and intraocular lenses.

7. The lens of claim 1, wherein the rewritable and freezable material comprises a polymer dispersed liquid crystal.

8. The lens of claim 1, wherein the rewritable and freezable material comprises a polymer-stabilized liquid crystal.

9. The lens of claim 1, wherein the rewritable and freezable material comprises an encapsulated liquid crystal.

10. The lens of claim 1, wherein the first refractive index value is changed by application of a first external energy source selected from the group of an electrical field, a magnetic field, an electromagnetic field, a thermal distribution, and an irradiance distribution.

11. The lens of claim 10, wherein the first external energy source has a temporal or spatial distribution of energy.

12. The lens of claim 1, further comprising a third element comprised of optical material.

13. The lens of claim 1, wherein the rewritable and freezable material comprises a bistable material.

14. The lens of claim 1, wherein the rewritable and freezable material comprises a bistable liquid crystal.

15. The lens of claim 14, wherein the bistable liquid crystal is polymer dispersed or polymer-stabilized.

16. The lens of claim 1, wherein the first refractive index value is changed and imparts a discernibly different optical power distribution in at least a portion of the at least one working region of the lens.

17. The lens of claim 1, wherein the refractive index distribution varies across the transverse coordinates x and y of the at least one working region of the lens.

18. A rewritable and freezable transmissive multifocal ophthalmic lens comprising:
at least a first working region and a second working region,
a first element comprising an active index rewritable and freezable material having a first refractive index value in at least the first working region of the lens and the second working region of the lens,
wherein application of a first external energy source to at least the first working region changes the first refractive index value to a second refractive index value comprising a refractive index distribution that imparts a discernible change in the optical power of the lens in the first working region that remains when the first external energy source is removed,
wherein application of a second external energy source to the second working region changes the first refractive index value to a third refractive index value that imparts a discernible change in the optical power or the optical power distribution in the second working region of the lens that remains when the second external energy source is removed,
wherein the optical power of the lens in the first working region is discernibly different from the optical power of the lens in the second working region, and
wherein the lens does not comprise a conductive plate or layer.

19. The lens of claim 18 wherein the second refractive index value comprises a refractive index distribution having a first spatial distribution over the first working region, and further comprising rewriting the second refractive index value to a fourth refractive index value, wherein the fourth refractive index value comprises a refractive index distribution imparting a second spatial distribution to the optical power of the lens in the first working region that is discernibly different from the optical power distribution imparted by the first spatial distribution of the second refractive index value.

20. The lens of claim 18, wherein the second refractive index value comprises a spatial refractive index distribution that varies across the transverse coordinates x and y of the first working region of the lens.

* * * * *